Patented June 13, 1950

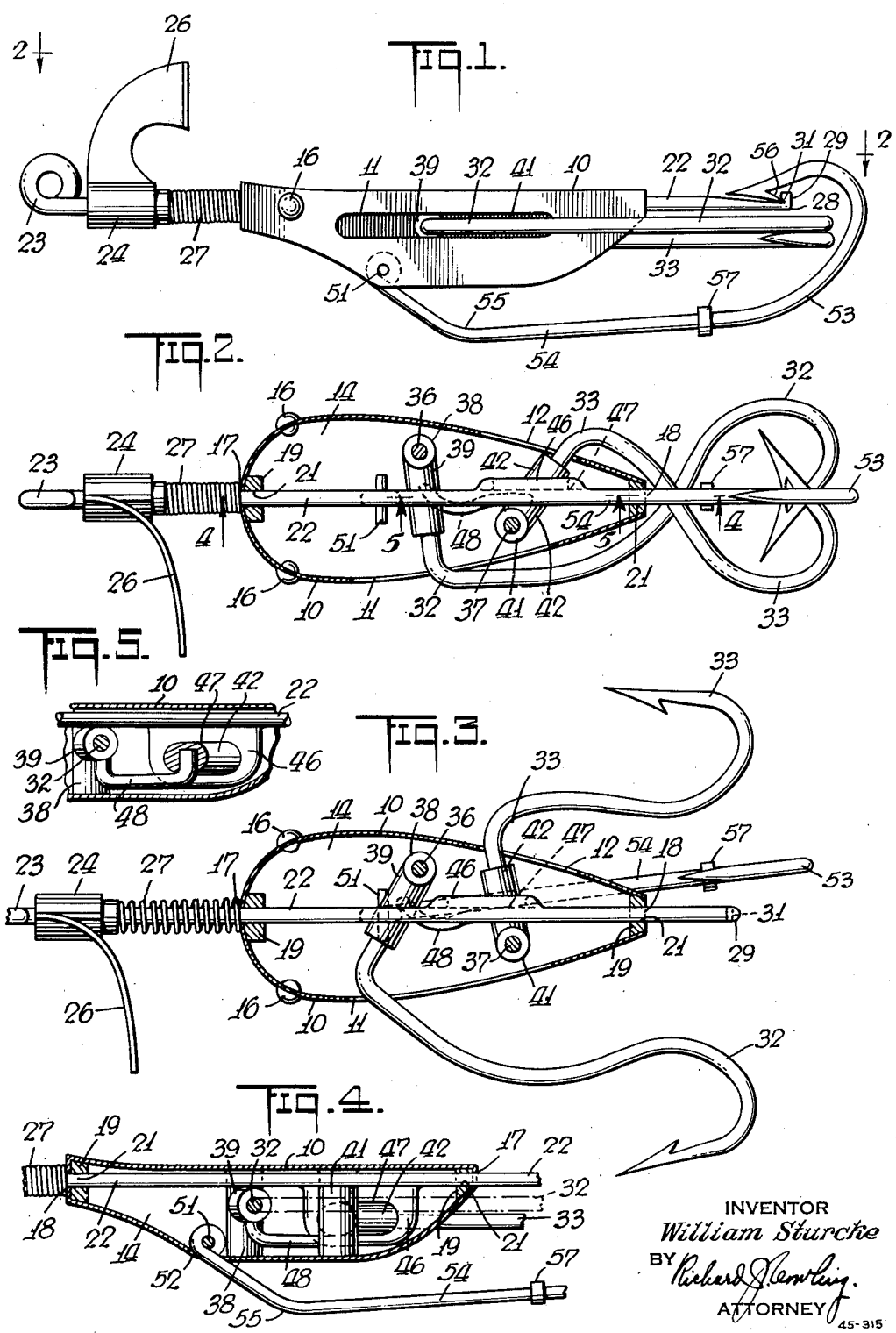

2,511,223

UNITED STATES PATENT OFFICE 2,511,223

WEEDLESS FISH LURE

William Sturcke, West Englewood, N. J.

Application December 29, 1945, Serial No. 637,834

8 Claims. (Cl. 43—35)

The present invention relates generally to improvements in fish lures, and it has particular relation to the so-called "weedless" type of fish lure.

An object of the present invention is to provide an improved weedless type of fish lure having a plurality of external hooks that may be set or cocked in a closed nested position without requiring the employment of especially designed weed guards or other unnecessary or disadvantageous locking means.

Another object of the invention is the provision of a weedless type of fish lure having a loosely mounted tail hook and a plurality of laterally mounted spreadable side hooks so arranged with respect to one another that they are adapted to be held in a closed and nested position, whereby all of their tines and pointed ends are protected so as not to catch on weeds and the like when in use.

Other and further objects and advantages of the invention reside in the detailed construction of the lure, which result in simplicity, economy and efficiency, and will be apparent from the following description, wherein a preferred embodiment of the invention is shown, reference being had to the accompanying drawings, forming a part hereof, wherein like numerals indicate like parts, in which:

Figure 1 is a side elevational view of a fish lure constructed in accordance with the principles of the invention, the same being shown on its back to illustrate its hook members in their closed, nested, or cocked position;

Figure 2 is a top plan view of the closed or nested lure shown in Figure 1, with parts being broken away for the sake of clearness, the same having been taken along the line 2—2 thereof, looking in the direction of the arrows;

Figure 3 is another top plan view of the lure taken substantially along the same line as Figure 2, but illustrating its open, spread or uncocked position of the several hooks; and Figure 4 is a fragmentary longitudinal sectional view of the lure shown in Figure 2, the same being taken substantially along the line 4—4 thereof, looking in the direction of the arrows, showing the linkage arrangement connecting the various hooks with respect to each other and to the tow-bar when they are in a closed or cocked position.

Figure 5 is an enlarged fragmentary longitudinal sectional view of the lure shown in Figure 2, the same being taken substantially along the line 5—5 thereof, looking in the direction of the arrows.

Referring now to the drawings, there is shown in Figure 1 a weedless fish lure having an elongated hollow bait body 10 of substantial length as compared to its width dimensions, provided with elongated slots 11 and 12 extending longitudinally thereof along opposite sides. The bait body 10 may be made of metal, plastic, wood or any other suitable material. The slots 11 and 12 are of different lengths and width, and are in open communication with each other through the hollow body cavity 14. Rivets 16 are mounted on opposite sides of the rounded forward end of the bait body 10 to provide eyes therefor, giving the lure a natural live appearance.

The bait body 10 is provided with aligned axial openings 17 and 18 in its forward and rear ends. Sleeve bushings 19 are mounted adjacent each of said openings 17 and 18 on the inner side of the bait body 10 and secured thereto in any suitable manner, as by soldering, welding, etc. The axial openings 21 of the sleeves 19 are aligned with the axial openings 17 and 18 of the bait body 10. A tow-bar 22 is slidably mounted through the axially aligned openings 17, 18 and 21 of the bait body 10, and is of sufficient length to project outwardly from the opposite ends thereof. The extreme forward end of the tow-bar 22 is bent backwardly upon itself, as indicated at 23, to form a loop or eye for securing a fish line (not shown) thereto in any suitable manner.

A spinner 24 is adapted to be mounted axially adjacent the front end of the tow-bar 22, and is provided with a highly colored, polished or otherwise glittering curved vane 26 for attracting fish thereto. The spinner 24 is loosely and rotatably mounted on the tow-bar 22 so that as the lure is being towed through the water the spinner will revolve slowly and impart a wavy motion to the bait body 10, thereby causing it to simulate the natural movement of a fish.

A spirally wound coil spring 27, having an axial opening therethrough, which is large enough to loosely receive the tow-bar 22, is mounted thereon between the forward end of the bait body 10 and the rear edge of the spinner 24. This spring normally tends to urge the tow-bar 22 forwardly of the bait body 10. It also keeps the spinner 24 spaced forwardly of the bait body 10, and its vane 26 from coming in contact therewith as the same revolves. The rear end of the tow-bar 22 is turned radially upwardly, as indicated at 28, to provide a hook engaging arm 29. The hook engaging arm 29 is provided with a recess or indentation on its inner face, as indicated at 31, for receiving the tine of a fish hook, as will hereinafter be more fully described.

A pair of laterally movable or swingable spreader hooks 32 and 33 of substantially S-shape are mounted within the hollow cavity 14 of the bait body 10, and one each projects outwardly therefrom through the slots 11 and 12 on opposite sides thereof. The shanks of each of the hooks 32 and 33 may be either of square cross-sectional shape or provided with flat sides or surfaces along their adjacent sides. A pair of spaced vertical pins or shafts 36 and 37 are fixedly mounted within the cavity 14 of the bait body 10, as best shown in Figs. 2 and 3, being one on each side of the tow-bar 22 in spaced longitudinal relation. A sleeve 38 is pivotally mounted on the shaft 36 and has a fixed laterally extending arm 39 formed integrally therewith, which arm 39 serves as a mounting for the hook 32. A similar sleeve 41 is mounted pivotally on the shaft 37 and is likewise provided with a fixed laterally extending arm 42 formed integrally therewith, which arm 42 serves as a mounting for the opposite hook 33. It will be noted that the arms 39 and 41 project transversely of the bait body 10, crossing over the two-bar 22, so that each hook projects outwardly of the bait body 10 from the side opposite from that in which it is mounted. The tow-bar 22 is provided with a vertically extending lug or flange 46, having an elongated slot 47 extending transversely therethrough. The arm 42 of the hook 33 passes through the slot 47 of the flange 46, which serves to impart movement to the arm 42 corresponding to the movement longitudinally of the rigidly connected tow-bar 22. A link member 48 connects the arm 42 with the arm 39, and thereby causes both arms 42 and 39 to move in unison.

A pin 51 is mounted transversely of the hollow cavity 14 forwardly of the shaft 36, and is provided with a longitudinally extending communicating slot 52 extending through the bottom of the bait body 10. (See Fig. 4.) A hook 53 is adapted to be mounted pivotally on the pin 51 through the opening 52 for movement vertically with respect to the bait body 10. The hook 53 is provided with an exceptionally long shank 54, which is bent, as indicated at 55, so as to extend longitudinally rearwardly in parallel spaced relation to the bottom of the bait body 10. The rearwardly projecting free end of the hook 53 is provided with a conventional fish hook point that is curved upwardly in a vertical plane, and is of sufficient length and height so that its tine or barb 56 will enter and engage the recess 31 on the arm 29 of the tow-bar 22 when the same is forced backwardly against its normal spring urging means 27. A flange or projection 57 is mounted on the shank 54 of the hook 53 just behind its curved free end, which will serve to prevent pork rind or other similar attracting bait material (not shown) from riding or climbing up its shank 54 when such bait material is being used on the hook portion 53.

In describing the operation of the weedless fish lure, it will be assumed that the same is in its spread or uncocked position, as shown in Figure 3. The tow-bar 22 is manually pushed backwardly against its normal spring urging means 27 until the tine 56 of the pivotal tail hook 55 can be positioned in the recess 31 of the arm 29, as best shown in Fig. 1, whereupon it will tend to hold the tow-bar 22 in such position against its normal forward spring urging means 27. As the tow-bar 22 is moved rearwardly, the flange or lug 46 carries the arm 42 rearwardly as it moves with the tow-bar 22, causing the hook 33 to move inwardly toward the bait body 10 into its nested or cocked position substantially along the longitudinal axis of the lure. As the arm 42 is carried rearwardly by the flange or lug 46, the link 48, which connects the arm 42 with the arm 39, causes the latter also to be moved rearwardly of the lure, thereby swinging the hook 32 also into its nested or cocked position from the opposite side of the bait body 10 into substantial axial alignment therewith, as best shown in Figures 1 and 2. Since the hooks 32 and 33 are mounted on their respective sleeves 38 and 41 in different horizontal planes, they will become superposed one over the other and the hook ends of each will become nested in such a manner that horizontally they will not be able to catch on weeds or the like. In their nested position, it will be apparent that the curved shank of one of the lateral swingable hooks will protect the barbed end of the other lateral swingable hook, and vice versa. It will also be apparent that the curved end of the free bottom hook 53, when attached to the arm 29 of the tow-bar 22, will provide vertical encirclement of the laterally nested hooks 32 and 33, thereby protecting them in such a manner that vertically they will not be able to catch on weeds or the like.

When a fish strikes the cocked or nested bait body 10 from any direction, the force of the strike will be sufficient to cause enough movement of the tow-bar 22 to free the tine 56 of the hook 53 from the receiving recess 31 thereof, whereupon the spring urging means will cause the tow-bar 22 to be moved instantly forward of the bait body 10. As the tow-bar 22 is moved forwardly of the bait body 10, the flange or lug 46 forces the sleeve 42 to pivot counter-clockwise on its pin 37, thereby throwing or swinging the hook 33 outwardly on a lateral plane away from the bait body, and at the same time the link 48 causes the arm 39 to pivot on its sleeve 38 in a clockwise direction, thereby causing the hook 32 to be thrown or swung outwardly from the opposite side of the bait body 10.

From the foregoing, it will be evident that a weedless bait lure is provided that dispenses with the need of having especially constructed weedguards that not only add to the cost of making the lure, but also provide additional and unnecessary hazards likely to foul the line or interfere with the catching of the fish.

Although I have only described one embodiment of the invention, it will be readily apparent to those skilled in the art that various changes and many widely different embodiments of the invention could be made without departing from the scope of the appended claims. It is intended, therefore, that all matter contained in the above-description or shown in the accompanying drawings shall be interpreted as illustrative and not in a limiting sense.

What I claim is:

1. A fish lure comprising a bait body having an opening transversely therethrough, a movable tow-bar mounted longitudinally of said bait body and projecting outwardly from opposite ends thereof, the forward end of said tow-bar having means for engaging a line, the rear end of said tow-bar having hook engaging means, means for normally urging said tow-bar forwardly of said bait body, a plurality of hooks swingably mounted within said opening and adapted to project outwardly of said body from opposite sides thereof, means carried by said tow-bar for manipulating said hooks whereby longitudinal movement of the tow bar will cause lateral movement of said hooks toward or away from each other and said bait body, and means for engaging the hook engaging means of said tow-bar to secure the same rearwardly of the bait body against its normal spring urging action whereby said side hooks will be superposed in a position axially of said bait body.

2. A fish lure comprising a bait body having an opening transversely therethrough, a movable tow-bar mounted longitudinally of said bait body and projecting outwardly from opposite ends thereof, the forward end of said tow-bar having means for engaging a line, the rear end of said tow-bar having hook engaging means, means for normally urging said tow-bar forwardly of said bait body, a plurality of hooks swingably mounted within said opening and adapted to project outwardly of said body from opposite sides thereof, means formed integrally with said tow bar for operating said hooks whereby longitudinal movement of the tow bar will cause lateral movement of said hooks toward or away from each other and said bait body, and means including a pivotal hook for engaging the hook engaging means of said tow-bar to secure the same rearwardly of the bait body against its normal spring urging action whereby said hooks will be so arranged that their respective pointed and barbed ends will be protected.

3. A weedless fish lure comprising an elongated bait body having slots along opposite sides thereof, a movable tow-bar mounted axially of said bait body and projecting outwardly from opposite ends thereof, the forward end of said tow-bar having means for receiving a line, the rear end of said tow-bar having hook engaging means for receiving the tine of a hook, means for normally urging said tow-bar forwardly of said bait body, a plurality of hooks of substantially S-shape swingably mounted within said hollow body and adapted to project outwardly therefrom through said slots, means for operatively connecting said hooks to said tow-bar whereby longitudinal movement of the latter will cause lateral movement of said hooks toward or away from each other and said bait body, and means including a pivotal hook adapted to extend beyond said lateral hooks when the latter are aligned axially of the bait body for protecting the same and engaging the hook receiving means of said tow-bar to hold the latter rearwardly of the bait body against its normal forward spring urging means.

4. A weedless fish lure comprising a bait body having openings along opposite sides thereof, a movable axial tow-bar, one end of said tow-bar having hook engaging means, means for normally urging said tow-bar forwardly of said bait body, a pair of hooks swingably mounted with respect to said bait body and adapted to project through said openings, means for operatively connecting said hooks to said tow-bar whereby longitudinal movement of the latter will cause lateral movement of said pair of hooks into axial alignment with said bait body or away from each other and said bait body, and a pivotal hook adapted to protect said lateral hooks when the latter are aligned with the bait body and engage the hook receiving means of said tow-bar to hold the same against its normal forward spring urging means.

5. A weedless fish lure comprising a bait body having openings along opposite sides thereof, a movable axial tow-bar, one end of said tow-bar having hook engaging means, a spinner carried by the other end of said tow-bar, means for normally urging said tow-bar toward one end of said bait body, a pair of hooks swingably mounted with respect to said bait body and adapted to project through said openings, means carried by said tow-bar for operating said hooks whereby longitudinal movement of the tow-bar will cause lateral movement of said pair of hooks toward or away from each other and said bait body, and a pivotal hook adapted to protect said lateral hooks when the latter are drawn into axial alignment with said bait body and engage the hook receiving means of said tow-bar to hold the same against its normal spring urging means.

6. A weedless fish lure comprising a bait body having an elongated opening extending transversely therethrough, a movable tow-bar mounted longitudinally of said bait body and projecting outwardly therefrom at opposite ends, the forward end of said tow-bar having means for engaging a line, the rear end of said tow-bar having hook receiving means, spring means axially mounted on said tow-bar for normally urging the latter forwardly of said bait body, a pair of hooks mounted swingably within said elongated opening and adapted to project outwardly of said bait body one from each side thereof, means for connecting said hooks to said tow-bar whereby longitudinal movement of the latter with respect to said bait body will cause said hooks to swing toward or away from each other and said bait body, and means including a hook mounted pivotally to the underside of said bait body for engaging the hook receiving means of said tow-bar to hold the latter rearwardly of said bait body against said normal spring urging means.

7. A weedless fish lure comprising a hollow bait body of substantial length as compared to its width dimensions having slots extending longitudinally along opposite sides thereof, a longitudinally movable tow-bar mounted axially of said bait body and projecting outwardly from opposite ends thereof, the forward end of said tow-bar carrying line engaging means, spring means mounted on said tow-bar between the forward end of said bait body and said line engaging means for normally urging the latter forwardly with respect of said bait body, a pair of spaced substantially S-shaped hooks mounted pivotally within said hollow body and adapted to project one each through said slots, means for connecting said hooks to said tow-bar for operating said hooks toward or away from each other and said bait body upon movement of said tow-bar, said hooks being swingable in different lateral planes inwardly into a closed superposed position beyond the rear end of said bait body when said tow-bar is moved rearwardly against its spring urging means, said hooks being swingable outwardly and away from each other and said bait body when said tow-bar is moved forwardly under said spring urging means, and a third hook mounted to pivot vertically of said bait body and adapted to be moved to engage the hook receiving means of the tow-bar to hold the latter rearwardly against said spring urging means, whereby said pair of spaced hooks when locked in their closed position are completely encircled by said third hook and tow-bar.

8. A weedless hollow fish lure having a body of substantial length as compared to its width dimensions provided with elongated longitudinally extending slots on opposite sides thereof, a longitudinally movable tow-bar mounted axially of said body and projecting outwardly from the front and rear ends thereof, the forward end of said tow-bar carrying a spinner and having means forwardly of said spinner for engaging a line, the rear end of said tow-bar having means for receiving a hook, spring urging means mounted on said tow-bar forwardly of said body for normally urging the latter forwardly thereof, a pair of spaced S-shaped hooks swingably mounted within said body and extending outwardly therefrom in opposite directions one through each of the side slots, means connecting said hooks operatively to said tow-bar whereby they may be moved toward or away from said body and each other in different horizontal planes whenever said tow-bar is moved longitudinally thereof, and a pivotal hook mounted below said body and movable in a vertical plane, said pivotal hook adapted to protect said swingable hooks and engage the hook receiving means of said tow-bar for holding the latter rearwardly against its normal spring urging means.

WILLIAM STURCKE.

REFERENCES CITED

The following references are of record in the file of this patent:

UNITED STATES PATENTS

| Number | Name | Date |
|---|---|---|
| 1,288,552 | Foster | Dec. 24, 1918 |
| 1,464,387 | Fishpaugh | Aug. 7, 1923 |